US006690175B2

(12) United States Patent
Pinzon et al.

(10) Patent No.: US 6,690,175 B2
(45) Date of Patent: Feb. 10, 2004

(54) METHOD AND DEVICE FOR ASSESSING THE STABILITY OF AN ELECTRIC POWER TRANSMISSION NETWORK

(75) Inventors: Christian Pinzon, Full-Reuenthal (CH); Joachim Bertsch, Baden-Dättwil (CH); Christian Rehtanz, Baden-Dättwil (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 09/991,957

(22) Filed: Nov. 26, 2001

(65) Prior Publication Data

US 2002/0097055 A1 Jul. 25, 2002

(30) Foreign Application Priority Data

Dec. 1, 2000 (EP) .............................. 00811144

(51) Int. Cl.$^7$ ......................... G01R 31/28; G01R 27/08
(52) U.S. Cl. ..................... 324/525; 324/522; 324/713
(58) Field of Search .......................... 324/525, 522, 324/512, 713

(56) References Cited

U.S. PATENT DOCUMENTS

| 5,631,569 A | | 5/1997 | Moore et al. |
| 5,661,664 A | * | 8/1997 | Novosel et al. ............ 700/293 |
| 6,249,719 B1 | * | 6/2001 | Vu et al. .................... 700/292 |

OTHER PUBLICATIONS

"Use of Local Measurements to Estimate Voltage–Stability Margin", Khoi Vu, et al., Power Industry Computer Applications (PICA) May 11–16, 1997, Columbus, Ohio.

"Voltage Instability Predictor (VIP) and Its Applications", Khoi Vu, et al., 13$^{th}$ PSCC in Trondheim, Jun. 28–Jul. 2, 1999.

"Quantifying Proximity to Voltage Collapse Using the Voltage Instability Predictor (VIP)", D.E. Julian, et al., 2000 IEEE, Jul. 2000.

"Grids Get Smart Protection and Control", Khoi Vu, et al., IEEE Computer Applications in Power, 1997, pp. 40–44.

* cited by examiner

*Primary Examiner*—N. Le
*Assistant Examiner*—John Teresinski
(74) *Attorney, Agent, or Firm*—Burns, Doane, Swecker & Mathis, L.L.P.

(57) ABSTRACT

In a method and system for assessing the stability of an electric power transmission network, where at least one pair of measurements including a first and a second measurement point (P1,P2), each measurement point comprising a voltage and a current phasor, is processed and where a Thévenin impedance (Zt) and a present stability margin (dS(k)) value are computed, a validity indicator (v) is computed which depends on whether there is a difference between the first and second measurement points and whether there is a difference between corresponding estimated first and second load impedances (Za). From all validity indicators (v) associated with all of the at least one pair of measurements a quality indicator (q) is computed that is associated with the Thévenin impedance value (Zt) and with the present stability margin (dS(k)). The invention allows to continuously compute and output a present stability margin (dS(k)) value and to provide a measure (q) of its quality.

11 Claims, 2 Drawing Sheets

METHOD AND DEVICE FOR ASSESSING THE STABILITY OF AN ELECTRIC POWER TRANSMISSION NETWORK

FIELD OF THE INVENTION

The invention relates to large-scale electric power transmission networks, and, more particularly, to a method for assessing the stability of an electric power transmission network, a power network stability estimating device and a computer program product according to the preamble of claims 1, 10 and 11, respectively.

BACKGROUND OF THE INVENTION

Electric power transmission and distribution systems or networks comprise high-voltage tie lines for connecting geographically separated regions, and substations for transforming voltages and for switching connections between lines. Power generation and load flow in a network with several substations is controlled by a central energy management system. An important issue in the control of a power generation and load flow is to keep the network stable, i.e. to avoid voltage collapses and swings. A method for assessing network stability, based on voltage margins, is described in the paper "Use of local measurements to Estimate Voltage-Stability Margin", K. Vu et al., Power Industry Computer Applications (PICA) May 12–16, 1997, IEEE, and in "Voltage instability predictor (VIP) and its applications", K. Vu et al., Power Systems Computation Conference (PSCC) June 1999. Both articles are herewith incorporated by reference. These articles describe a "Voltage Instability Predictor" (VIP) which measures currents and voltages locally in order to infer a proximity to voltage collapse. The concept of the VIP is shown in FIG. 1. One part of an electric power system is treated as a power source, another part as a load. The power source is represented by its Thévenin equivalent 1 with a source voltage Et and a Thévenin or source impedance Zt. The load is represented by an apparent load impedance Za. Both the Thévenin impedance Zt and the apparent load impedance Za are estimated from the current and voltage measurements by a VIP device 2. The relation of these impedances, expressed by a stability margin or power margin, indicates how close the power system or network is to collapsing.

Given a first measurement point comprising a first voltage phasor V1 and a first current phasor I1, a first load impedance Za1 is computed as $$Za1 = \frac{V1}{I1}.$$

Given a second measurement point comprising a second voltage phasor V2 and a second current phasor I2, the Thévenin impedance Zt is computed as $$Zt = -\frac{V2 - V1}{I2 - I1}.$$

Note that the phasors as well as the impedances are vector quantities. A practical difficulty lies in estimating the Thévenin impedance Zt correctly. In particular, if the apparent load impedance Za corresponding to the first and second measurement points does not change, then the value for the Thévenin impedance Zt is invalid.

In U.S. Pat. No. 5,631,569, a system for temporary measurement of network parameters is shown. The magnitude of the Thévenin impedance Zt is estimated by taking advantage of natural fluctuations in the power network, which cause measured voltages and currents to change. A RMS (root mean square) voltage and an RMS current are measured cyclically. For each cycle, a scalar apparent load impedance is computed. The Thévenin impedance is only computed if two cycles with disparate load impedances are identified. In the preferred embodiment, a 10% difference in load impedance is considered useful for calculating Thévenin impedance. Successive values of the Thévenin impedance are stored and statistical data is generated and maintained for the successive values. When a standard deviation falls below one sigma, the mean of the values is displayed.

The VIP however, requires not just a single value for occasional display, but a continuous generation of estimated values for the Thévenin impedance Zt that are suited for the generation of a stability margin and for use in a network or substation control system.

SUMMARY OF THE INVENTION

It is therefore an object of the invention to create a method for assessing the stability of an electric power transmission network, a power network stability estimating device and a computer program product that provide a continuous generation of a stability margin that is suited for use in a network or substation control system.

These objects are achieved by a method for assessing the stability of an electric power transmission network and a power network stability estimating device according to the claims 1 and 10, respectively, and by a computer program product according to claim 11.

In the inventive method and device for assessing the stability of an electric power transmission network, where at least one pair of measurements comprising a first and a second measurement point, each measurement point comprising a voltage and a current phasor, is processed and where a Thévenin impedance and a stability margin value are computed, a validity indicator is computed which depends on whether there exists a predetermined difference between the first and second measurement points and, if this is the case, also on whether there exists a predetermined difference between corresponding first and second load impedances. From all validity indicators associated with all of the at least one pair of measurements a quality indicator is computed that is associated with the Thévenin impedance value and with the stability margin value.

The invention allows to continuously compute and output a stability margin value and to provide a measure of its quality. This allows an operator to take informed control actions. In a preferred embodiment of the invention, the stability margin value and associated quality indicator are transmitted to a network or substation control system. This allows, for example, the control system to automatically react to a problem in the network, indicated by the stability margin, only when the associated quality indicator qs show that the stability margin is of a high quality, i.e. higher than a predetermined threshold value.

In a preferred variant of the invention, the validity indicator v indicates whether the associated pair of measurements provides a valid, an unchanged or an invalid Thévenin impedance.

In a preferred embodiment of the invention, the device comprises means for displaying the quality indicator q and/or means for transmitting the quality indicator q and the stability margin value to a control system that controls at least part of the power network.

A computer program product according to the invention comprises a computer readable medium, having thereon: computer program code means to make, when said program is loaded, the computer execute a method for assessing the stability of an electric power transmission network according to inventive method.

Further preferred embodiments are evident from the dependent patent claims.

BRIEF DESCRIPTION OF THE DRAWINGS

The subject matter of the invention will be explained in more detail in the following text with reference to preferred exemplary embodiments which are illustrated in the attached drawings, in which.

The reference symbols used in the drawings, and their meanings, are listed in summary form in the list of reference symbols. In principle, identical parts are provided with the same reference symbols in the figures.

DETAILED DESCRIPTION OF THE INVENTION

Figure 1:
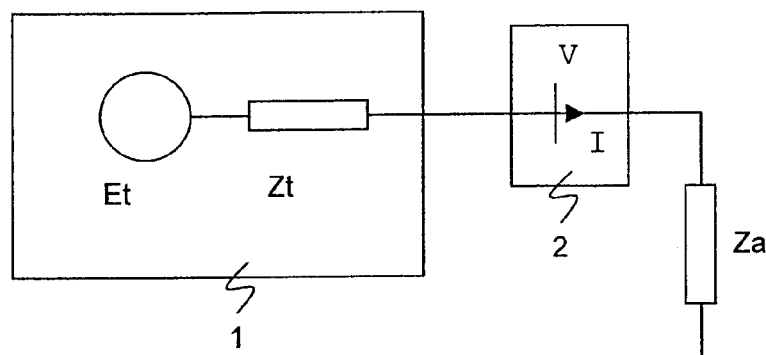
FIG. 1 shows schematically a conceptual structure for assessing network stability, according to the state of the art.

FIG. 1 schematically shows a conceptual structure for assessing network stability, in which one part of an electric power system is treated as a power source, another part as a load. The power source is represented by its Thévenin equivalent 1 with a Thévenin or source impedance Zt. The load is represented by an apparent load impedance Za. A VIP device 2 determines phasor data with a phasor measurement unit residing, for example, at a feeder at the bay level of substations or at branching points along transmission lines. A voltage phasor represents, for example, a voltage of the feeder or line, while a current phasor represents current flowing through the feeder or line.

The phasor data represents a phasor and may be a polar number, the absolute value of which corresponds to either the real magnitude or the RMS value of a quantity, and the phase argument to the phase angle at zero time. Alternatively, the phasor may be a complex number having real and imaginary parts or the phasor may use rectangular or exponential notation. Phasors may be used to represent quantities such as the voltage, current, power or energy associated with a phase conductor or an electronic circuit. By contrast, conventional sensing devices used in power networks generally measure only scalar, average representations, such as the RMS value of a voltage, current etc.

In some VIP applications, the phasor data is collected from phasor measurement units that are distributed over a large geographic area, i.e. over tens to hundreds of kilometres. For applications in which the phasor data from these disparate sources are analysed in conjunction, they must refer to a common phase reference. In other words, the different phasor measurement units must have local clocks that are synchronised to within a given precision. Such a synchronisation of the phasor measurement units is preferably achieved with a known time distribution system, for example the global positioning (GPS) system. In a typical implementation, the phasor data 9 is determined at least every 200 or every 100 or preferably every 40 milliseconds, with a temporal resolution of preferably less than 1 millisecond. In a prefered embodiment of the invention, the temporal resolution is less than 10 microseconds, which corresponds to a phase error of 0.2 degrees. Each measurement is associated with a time stamp derived from the synchronised local clock. The phasor data therefore comprises time stamp data.

The VIP assesses the stability of the electric power transmission network by determining a stability margin value pertinent to specific entities and/or a combination of entities within the network. A measure of stability is expressed in terms of impedances or, as a voltage margin, in terms of voltages. In the example described in the background of the invention, a power margin is used as a stability margin. A power margin is a more intuitive representation than a voltage or impedance margin. A local power margin represents for example the amount of power that may be transmitted through a given transmission line of the network. A global power margin combines phasor data collected from a plurality of phasor measurement units.

Figure 2:
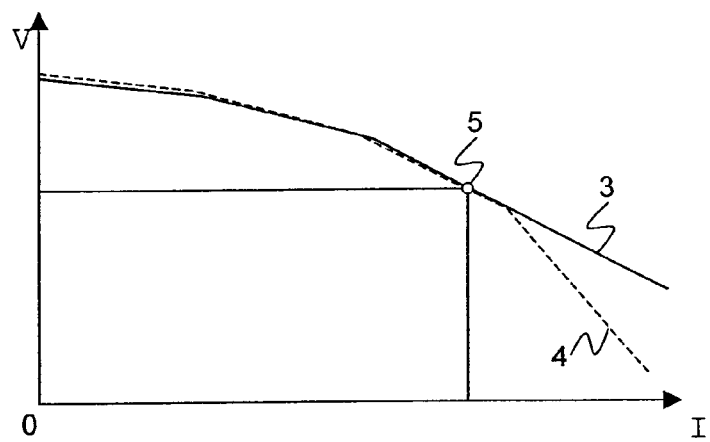
FIG. 2 is a diagram showing currents and voltages at a selected point in an electric power network.

FIG. 2 shows a plot of voltage and current at a given point in a power network, where a VIP device is located. This may be at a feeder of a tie line or a load. When the load gets stronger, the current increases and the voltage drops. The actual voltage versus current curve (V/I curve) is represented by the drawn out line 3. The actual behaviour is influenced by the entire network, but is estimated from local measurements by the VIP device. The VIP computes provides an estimate of this curve, shown by the dashed line 4. In particular, the slope of the curve corresponds to the magnitude |Zt| of the Thévenin impedance Zt computed by the VIP device. Given this estimated curve, the maximum power, in MVA, that may be transmitted through said feeder under the current network conditions is computed. The maximum power corresponds to a point on the estimated V/I curve 4 for which the product of current and voltage is maximal. The power margin, for a present operating point 5, is the difference between the maximum power and the power being currently transmitted. Let the present time current and voltage magnitudes be I(k) and V(k), respectively. Then the present power margin or present stability margin dS(k) corresponding to said feeder is $$dS(k) = \frac{(V(k) - |Zt| \cdot I(k))^2}{4|Zt|},$$

In summary, the stability margin computation method gives, based on online current and voltage phasor measurements, a continuously adapted estimate of how much more power may be transferred through a tie line or how much more power may be drawn by a substation before the network collapses. This is particularly advantageous in situations where the network state slowly moves towards instability, without tell-tale disruptive events that would indicate a critical situation.

The concepts of the invention are now explained in terms of a projection into the two-dimensional impedance plane. The invention however involves vector values representing phasors for voltages, currents and impedances, for which the same concepts hold. Only in the computation of the stability margin dS shown above are scalar values, i.e. magnitudes of corresponding values used.

Figure 3:
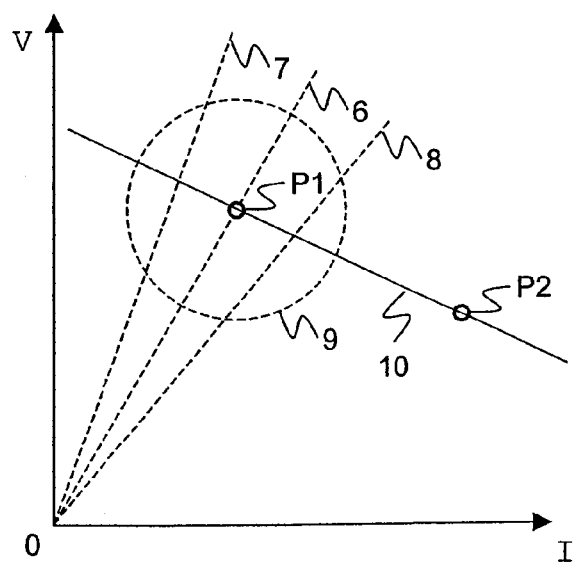
FIG. 3 is a diagram showing two measurement points in an impedance plane.

FIG. 3 is a diagram showing a first measurement point P1 and a second measurement point P2 in an impedance plane spanned by a current axis I and a voltage axis V. All measurements that result in the same apparent load impedance Za as the first measurement point P1 lie on a first impedance line 6 that passes through the first measurement point P1 and the intersection of the current and voltage axes. All measurements that differ from said apparent load impedance Za by less than a predetermined maximum difference lie in a sector that is defined by a second impedance line 7 and a third impedance line 8 which pass through the axes intersection and correspond e.g. to the apparent load impedance Za±10%. All measurements that differ from the first measurement point P1 by less than a given maximum vector difference lie in a circle 9 centred at the first measurement point P1. In order to compute said difference, voltage and current values are scaled, e.g. with respect to nominal operating values. A source impedance line 10 passing through both the first measurement point P1 and the second measurement point P2 has a slope that corresponds to the value of the Thévenin impedance Zt computed from the two measurement points P1,P2. A measurement point that lies on the first impedance line 6 of the first measurement point P1 does not provide, in conjunction with the first measurement point P1, information about the slope of the source impedance line 10.

Figure 4:
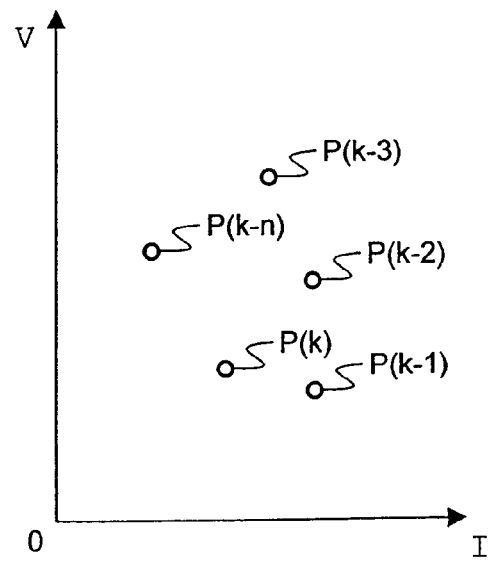
FIG. 4 is a diagram showing a set of measurement points in the impedance plane.

FIG. 4 is a diagram showing a set of successive measurement points P(k-n) . . . P(k-2), P(k-1), P(k) in the impedance plane. According to the invention, any pair of points may be used in an attempt to determine the Thévenin impedance Zt. The invention tests a preferably large number of pairs, determines which pairs provide valid values, and computes a composite Thévenin impedance Zt along with a measure of its quality.

The inventive method functions as follows: The VIP device 2 repeatedly measures, at a given point of the power system and at a plurality of time instants, a plurality of measurement points, each consisting of a voltage phasor and a current phasor. At least one pair of measurements is determined, comprising a first measurement point P1 and a second measurement point P2, where the first measurement point P1 comprises a first voltage phasor V1 and a first current phasor I1 and the second measurement point P2 comprises a second voltage phasor V2 and a second current phasor I2.

In a first preferred embodiment of the invention, each pair of measurements corresponds to a pair of successive measurement points. That is, given a sequence of measurement points P(k-n) . . . P(k-2), P(k-1), P(k), a first pair of measurements is {P(k-n), P(k-n+1)}, a second pair of measurements is {P(k-n+1), P(k-n+2)}, etc . . . up to {P(k-1), P(k)}.

In a second preferred embodiment of the invention, a predetermined number of measurement points is measured and stored. A plurality of pairs of measurements is determined by pairing each member of the set of measurement points with all other members of the set. That is, given a sequence of n+1 measurement points P(k-n) . . . P(k-2), P(k-1), P(k), pairs are, with m=k-n:
{P(m), P(m+1)}, {P(m), P(m+2)}, {P(m), P(m+3)}, . . . {P(m), P(k))},
{P(m+1), P(m+2)}, {P(m+1), P(m+3)}, {P(m+1), P(m+4)}, . . . {P(m+1), P(k)},
{P(m+2), P(m+3)}, {P(m+2), P(m+4)}, {P(m+2), P(m+5)}, . . . {P(m+2), P(k)}, . . .
{P(k-3), P(k-2)}, {P(k-3), P(k-1)}, {P(k-3), P(k)},
{P(k-2), P(k-1)}, {P(k-2), P(k)},
{P(k-1), P(k)}.

Each ordered pair of measurements, consisting of an older and a newer measurement point, corresponds to the first measurement point P1 and second measurement point P2 in the repeated execution of the following steps:

For each pair of measurements, a first boolean value that indicates a change or difference between the first and second measurement point is computed. The first boolean value is true only if a minimal difference between the first and second measurement point (P1,P2) exists.

In a preferred embodiment of the invention, the first boolean value indicates whether at least one of a voltage difference between the first and second voltage phasor and a current difference between the first and second current phasor exceed a given respective voltage or current difference threshold. Referring to FIG. 3, this corresponds to a test whether the second measurement point P2 lies outside a rectangle (not shown) parallel to the axes and centered around the first measurement point P1. In a preferred embodiment of the invention, the voltage threshold is approximately less than one or one half percent of the operating voltage, and the current threshold is approximately 1 to 2 percent of the operating current.

In another preferred embodiment of the invention, the first boolean value indicates whether a vector difference between the first and second measurement point exceeds a given distance threshold. Referring to FIG. 3, this corresponds to a test whether the second measurement point P2 lies outside the circle 9 or an oval (not shown) centered around the first measurement point P1. The exact shape of the circle 9 or oval depends on scaling factors for currents and voltages.

Since the impedances are vector values, the circle, oval and rectangle referenced in the above explanation correspond to their higher-dimensional equivalents.

If the first boolean value is false, then there is not a minimal difference between the first and second measurement point P1,P2, that is, the second measurement point P2 lies within said rectangle or oval, then the measurement points P1,P2 are considered to be essentially equal and a corresponding counter in incremented. In the embodiment in which each pair of measurements corresponds to a pair of successive measurement points, this equality indicates that a network state has not changed essentially since the last valid Thévenin impedance Zt was computed and it may therefore be displayed or used by a control system.

If there is a minimal difference between the first and second measurement point P1,P2, then, from the first measurement point, a first load impedance $$Za1 = \frac{V1}{I1},$$

is computed, and, from the second measurement point, a second load impedance $$Za2 = \frac{V2}{I2},$$

is computed, and a second boolean value is computed that indicates whether a difference between the first and second load impedance exceeds a given impedance threshold. Said difference is preferably expressed in terms of one of the load impedances, for example in that the second load impedance should differ from the first load impedance by more than ±5%. Referring to FIG. 3, this corresponds to the condition that the second measurement point P2 should lie outside the sector between the second impedance line 7 and the third impedance line 8.

If the difference between the first and second load impedance does not exceed the given impedance threshold, then the network state has changed, but the pair of measurements cannot be used to provide a valid estimate of the Thévenin impedance Zt, and a corresponding counter is incremented.

If the difference between the first and second load impedance does exceed the given impedance threshold, then the network state has changed, and a valid Thévenin impedance Zt can be computed from the pair of measurements, and a corresponding counter is incremented. The Thévenin impedance Zt is computed as $$Zt = -\frac{V2 - V1}{I2 - I1}.$$

As a result of the steps described so far, each pair of measurements is associated with a validity indicator v corresponding to the first and optionally the second boolean value. The validity indicator v indicates whether the associated pair of measurements provides a valid, an unchanged or an invalid Thévenin impedance. The plurality of measurement points and associated pairs of measurements is associated with the values of the three counters corresponding to unchanged, invalid and valid Thévenin impedances Zt.

For example, a sequence of measurements occurring every 200 ms over a duration of 10 seconds results in 51 measurement points. Processing, according to the first preferred embodiment of the invention, the measurement points in sequence, i.e. pairing only measurements that follow one another, gives a set of 50 pairs of measurements. Pairing all measurements with each other, according to the second preferred embodiment of the invention gives a set of 50+49+48+47+ . . . +3+2+1=1275 pairs.

The method as described so far determines how many pairs of the set of pairs of measurements result in unchanged, invalid and valid Thévenin impedances Zt. For example, of the 50 pairs of measurements, 10 might correspond to unchanged values, 5 might be invalid and 35 might be valid, indicating an adequate quality of the information contained in the set. On the other hand, values such as 40 "unchanged", 5 "invalid" and 5 "stable" indicate that no dynamic variation of the network has taken place and that earlier values of Thévenin impedance Zt and stability margin dS remain valid. Similarly, values such as 2 "unchanged", 40 "invalid" and 5 "stable" indicate that the corresponding Thévenin impedance Zt and stability margin dS values are of low quality.

In order to obtain a composite value of the Thévenin impedances Zt determined for the set of pairs of measurements, said Thévenin impedances Zt are filtered or processed statistically, for example by averaging them.

In a further step, from all validity indicators v associated with all of the pairs of the set of pairs of measurements a quality indicator q is computed that is associated with the Thévenin impedance value and with the present stability margin dS(k) value. For example, a relatively high number Nval of valid Thévenin impedances Zt in a set of Ntot pairs indicates a high quality. In a preferred embodiment of the invention, the quality indicator q also incorporates a measure of a distribution of the Thévenin impedance Zt values and/or an absolute number of valid Thévenin impedances Zt. With weighting factors w1, w2, w3, a standard deviation s of said distribution, a preferred quality indicator q is defined as $$q = w1 \cdot \frac{Nval}{Ntot} + w2 \cdot s + w3 \cdot Nval$$

From the composite Thévenin impedance Zt and from a present measurement point P(k), a present stability margin dS(k) that characterizes network stability is computed. In a preferred embodiment of the invention, the stability margin dS(k) at a present time is computed as $$dS(k) = \frac{(V(k) - |Zt| \cdot I(k))^2}{4|Zt|}$$

where V(k) is a magnitude of a present voltage and I(k) is a present current magnitude, both corresponding to the present measurement point P(k).

The stability margin dS may be computed for each valid Thévenin impedance Zt and then averaged or filtered in other ways, or the stability margin dS may be computed for only one averaged or filtered Thévenin impedance Zt without changing the essence of the invention.

In a preferred embodiment of the invention, the composite Thévenin impedance Zt and/or an associated stability margin dS is displayed to an operator, either in numerical form or graphically, for example as a trajectory over time or trend graph. The quality indicator q is represented graphically by, for example, coloring the displayed number or time history accordingly. In another embodiment, a trend graph of the Thévenin impedance Zt is displayed together with a trend graph of at least one of the relative number of pairs of measurements providing valid, invalid or unchanged Thévenin impedances Zt.

Since the inventive method and device give a continuously updated stability margin dS and Thévenin impedance Zt with an associated quality indicator q, they can be used in the operation of a power network. In a preferred embodiment of the invention, these values are associated with a time stamp or time information. This allows a integration of values across the power system.

The additional information provided by the quality indicator q allows a differentiated use by either an operator or an automated process, as shown in the following examples:

If more than half of all pairs of measurements of a set have essentially equal currents and voltages, then the power system does not show any dynamic variation and no new values need to be computed. An existing valid value of Thévenin impedance Zt or stability margin dS remains valid.

If more than half of all pairs of measurements of a set have essentially different currents and voltages, but less than half have essentially a different load impedance, then the power system does show a dynamic variation, but without large load changes, and a Thévenin impedance Zt or stability margin dS should have only informative character.

If more than half of all pairs of measurements of a set have essentially different currents and voltages, and more than half have essentially a different load impedance, then the power system does show a dynamic variation with large load changes. A Thévenin impedance Zt or stability margin dS can be used to decide on protective measures such as load shedding.

In a further preferred embodiment of the invention, depending on the quality indicator and the present stability margin dS(k) value, a control action is initiated automatically. In order to do this, Thévenin impedances Zt and associated stability margins dS are transmitted to control system or energy management system of a power network, or to a control system of an electric substation. Since certain critical control actions such as load shedding are required if network stability is in danger, a corresponding control program effects the shedding of a given load only if the stability margin dS has a predetermined minimal quality. For a less important load, a lower quality may be required.

Figure 5:
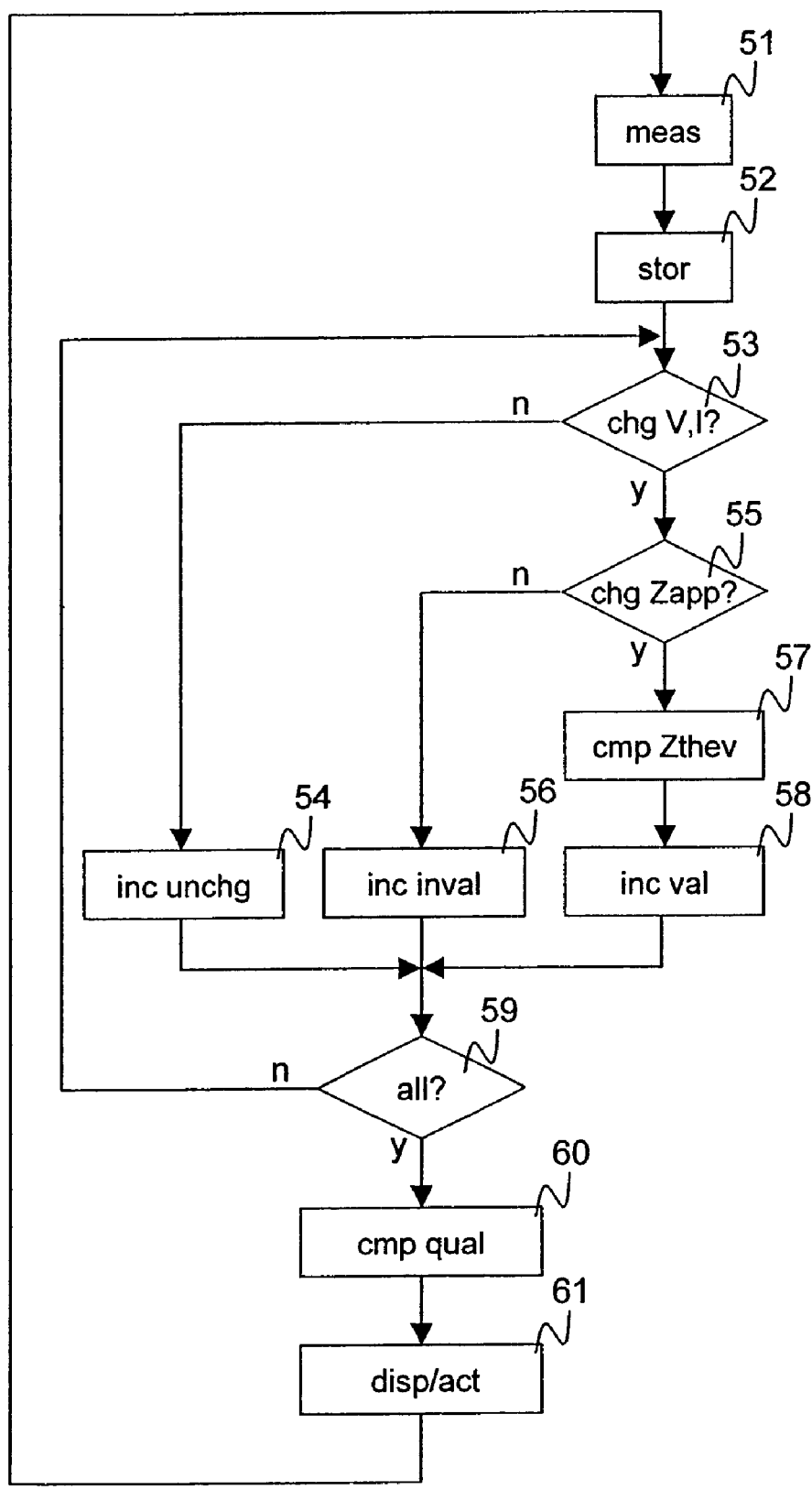
FIG. 5 is a flow diagram of the inventive method.

FIG. 5 is a flow diagram of the inventive method. In step 51, time stamped voltage and current values are measured. In step 52, these values are stored in a buffer, providing a set of measurement points on which the subsequent steps operate. In step 53, one pair of measurements is selected and a check if made if at least the voltage or the current values of the two measurements differ. If this is not the case, i.e. if both the voltage and current values are unchanged, then, in step 54, a counter for the number of measurement pairs with unchanged Thévenin impedance Zt is incremented. Otherwise, in step 55, it is checked whether he load impedances corresponding to the pair of measurements differ. If they do not, then, in step 56, a counter for the number of measurement pairs with invalid Thévenin impedance Zt is incremented. If they do, then in step 57 the Thévenin impedance Zt is computed and stored, and, in step 58, a counter for the number of measurement pairs with valid Thévenin impedance Zt is incremented. After each of the incrementing steps 54,56,58, step 59 tests if all measurement pairs have been processed. If this is not the case, then processing resumes at step 53. Otherwise, in step 60, the quality indicator and best Thévenin impedance estimate are computed from the stored Thévenin impedance Zt and from the values of the counters. The counters are reset to zero, and in step 61 the best Thévenin impedance estimate and quality indicator are displayed and/or transmitted to a control system, together with associated timing information.

List of Designations

| [0059] | 1 | Thévenin equivalent |
|---|---|---|
| [0060] | 2 | voltage instability predictor VIP |
| [0061] | 3 | actual V/I curve |
| [0062] | 4 | estimated V/I curve |
| [0063] | 5 | operating point |
| [0064] | 6 | first impedance line |
| [0065] | 7 | second impedance line |
| [0066] | 8 | third impedance line |
| [0067] | 9 | circle |
| [0068] | 10 | source impedance line |
| [0069] | P(k) | present measurement point |
| [0070] | P(k-n) | . . . P(k-2), P(k-1), P(k) measurement points |
| [0071] | P1 | first measurement point |
| [0072] | P2 | second measurement point |
| [0073] | V1 | first voltage phasor |
| [0074] | V2 | second voltage phasor |
| [0075] | V(k) | present voltage magnitude |
| [0076] | I(k) | present current magnitude |
| [0077] | I1 | first current phasor |
| [0078] | I2 | second current phasor |
| [0079] | v | validity indicator |
| [0080] | q | quality indicator |
| [0081] | dS | stability margin |
| [0082] | dS(k) | present stability margin |
| [0083] | Za | apparent load impedance |
| [0084] | Zt | Thévenin impedance, source impedance |
| [0085] | 51 | measure and time tag voltage and current |
| [0086] | 52 | store measurement in buffer |
| [0087] | 53 | test a measurement pair for difference |
| [0088] | 54 | increment number of measurement pairs with unchanged Thévenin impedance |
| [0089] | 55 | test a load impedance pair for difference |
| [0090] | 56 | increment number of measurement pairs with invalid Thévenin impedance |
| [0091] | 57 | compute Thévenin impedance |
| [0092] | 58 | increment number of measurement pairs with valid Thévenin impedance |
| [0093] | 59 | test if all measurement pairs have been processed |
| [0094] | 60 | compute quality indicator and best Thévenin impedance estimate |
| [0095] | 61 | display and/or transmit results |

What is claimed is:

1. A method for assessing the stability of an electric power transmission network, where said network comprises a plurality of substations, buses and lines, and where the method comprises the steps of repeatedly
   a) measuring, at a given point of the power network and at a plurality of time instants, a plurality of measurement points, each consisting of a voltage phasor and a current phasor,
   b) determining at least one pair of measurements comprising a first measurement point (P1) and a second measurement point (P2), where the first measurement point (P1) comprises a first voltage phasor V1 and a first current phasor I1 and the second measurement point (P2) comprises a second voltage phasor V2 and a second current phasor I2,
   c) computing a Thévenin impedance Zt as $$Zt = -\frac{V2 - V1}{I2 - I1}$$

d) and computing, from the Thévenin impedance Zt and from a present measurement point (P(k)), a present stability margin dS(k) that characterizes network stability,
   wherein the method comprises, for each of the at least one pair of measurements,
   e) computing a first boolean value that is true only if a minimal difference between the first and second measurement point (P1,P2) exists,
   f) computing, only if the first boolean value is true, from the first measurement point (P1) a first load impedance $$Za1 = \frac{V1}{I1},$$

g) computing, only if the first boolean value is true, from the second measurement point (P2) a second load impedance $$Za2 = \frac{V2}{I2},$$

h) computing, only if the first boolean value is true, a second boolean value that indicates whether a difference between the first and second load impedance Za1, Za2 exceeds a given impedance threshold,
   i) computing, from the first boolean value and, if the first boolean value is true, also from the second boolean value, a validity indicator (v) that is associated with the pair of measurements,
   and, for all of the at least one pair of measurements
   j) computing, from a plurality of Thévenin impedances Zt, each of which is associated with a different pair of measurements, a composite Thévenin impedance Zt, and k) computing, from all validity indicators (v) that are respectively associated with all of the at least one pair of measurements, a quality indicator (q) that is associated with the composite Thévenin impedance value and with the present stability margin dS(k).

2. Method according to claim 1, wherein the stability margin dS(k) at a present time is computed as $$dS(k) = \frac{(V(k) - |Zt| \cdot I(k))^2}{4|Zt|},$$

where V(k) is a magnitude of a present voltage and I(k) is a present current magnitude, both corresponding to the present measurement point (P(k)).

3. Method according to claim 1, wherein the first boolean value is true only if at least one of a voltage difference between the first and second voltage phasor and a current difference between the first and second current phasor exceed a given respective threshold.

4. Method according to claim 1, wherein the first boolean value is true only if a vector difference between the first and second measurement point (P1,P2) exceeds a given distance threshold.

5. Method according to claim 1, wherein the repeated execution of the method steps applies to successive measurement points.

6. Method according to claim 1, wherein,
in step a), a set of measurement points is measured, and that,
in step b), a plurality of pairs of measurements is determined by repeatedly pairing each member of the set of measurement points with all other members.

7. Method according to claim 1, wherein the validity indicator (v) indicates whether the associated pair of measurements provides a valid, an unchanged or an invalid Thévenin impedance.

8. Method according to claim 1, wherein a visual representation of the quality indicator (q) is displayed on a display device.

9. Method according to claim 1, wherein, depending on the quality indicator (q) and the present stability margin dS(k), a control action is initiated.

10. A computer program product comprising a computer readable medium, having thereon: computer program code means to make, when said program is loaded, the computer execute a method for assessing the stability of an electric power transmission network according to claim 1.

11. Power network stability estimating device, where said network comprises a plurality of substations, buses and lines, where the device is configurable to measuring, at a given point of the power network and at a plurality of time instants, a plurality of measurement points, each consisting of a voltage phasor and a current phasor, and where the device comprises
a) a means for determining at least one pair of measurements comprising a first measurement point P1 and a second measurement point P2, where the first measurement point P1 comprises a first voltage phasor V1 and a first current phasor I1 and the second measurement point P2 comprises a second voltage phasor V2 and a second current phasor I2, b) a means for computing a Thévenin impedance Zt as $$Zt = -\frac{V2 - V1}{I2 - I1},$$

c) and a means for computing, from the Thévenin impedance Zt and from a present measurement point (P(k)), a present stability margin dS(k) that characterizes network stability, wherein the device comprises e) a means for computing, for each of the at least one pair of measurements, a first boolean value that is true only if a minimal difference between the first and second measurement point (P1,P2) exists, f) a means for computing, only if the first boolean value is true, for each of the at least one pair of measurements, from the first measurement point, a first load impedance $$Za1 = \frac{V1}{I1},$$

g) a means for computing, only if the first boolean value is true, for each of the at least one pair of measurements, from the second measurement point, a second load impedance $$Za2 = \frac{V2}{I2},$$

h) a means for computing, only if the first boolean value is true, for each of the at least one pair of measurements, a second boolean value that indicates whether a difference between the first and second load impedance Za1, Za2 exceeds a given impedance threshold, i) a means for computing, from the first boolean value and, if the first boolean value is true, also from the second boolean value, validity indicator (v) that is associated with the pair of measurements, and, that the device comprises a means for computing, for all of the at least one pair of measurements, j) from a plurality of Thévenin impedances Zt, each of which is associated with a different pair of measurements, a composite Thévenin impedance Zt, and k) from all validity indicators (v) that are respectively associated with all of the at least one pair of measurements, a quality indicator (q) that is associated with the composite Thévenin impedance value and with the present stability margin dS(k).

* * * * *